United States Patent [19]

Gergely et al.

[11] Patent Number: 4,554,261

[45] Date of Patent: Nov. 19, 1985

[54] COMPOSITION AND METHOD FOR REMOVING CHLORAMINE FROM WATER CONTAINING SAME

[75] Inventors: Anthony J. Gergely, Converse; Ralph A. Nichols, Kerrville, both of Tex.

[73] Assignee: Jungle Laboratories Corporation, Cibolo, Tex.

[21] Appl. No.: 633,027

[22] Filed: Jul. 23, 1984

[51] Int. Cl.$^4$ .............................................. B01J 20/16
[52] U.S. Cl. ...................................... 502/62; 502/60; 210/679
[58] Field of Search ........................... 502/60, 62, 217; 210/679; 55/75

[56] References Cited

U.S. PATENT DOCUMENTS

| | | | |
|---|---|---|---|
| 3,036,984 | 5/1962 | O'Connor et al. | 502/62 |
| 3,359,092 | 12/1967 | Dunham, Jr. et al. | 502/60 X |
| 4,059,543 | 11/1977 | Kiovsky et al. | 502/60 |
| 4,239,655 | 12/1980 | Inoue et al. | 502/60 |

FOREIGN PATENT DOCUMENTS 61615  4/1982  Japan ................................. 502/62

Primary Examiner—Carl F. Dees
Attorney, Agent, or Firm—Harold H. Dutton, Jr.

[57] ABSTRACT

A composition for treating water to remove chloramine therefrom comprising a zeolite resin having a coating of sodium thiosulfate thereon and optionally having ascorbic acid and methylene blue included in the coating; a method for using the composition to remove chloramine in a single step comprising contacting the water to be treated with the composition.

8 Claims, No Drawings

COMPOSITION AND METHOD FOR REMOVING CHLORAMINE FROM WATER CONTAINING SAME

This invention relates to a product and method for removing chloramine from water. More particularly, the invention relates to a product and method for treating water to remove chloramine which is toxic too fish in order that the water may be used in aquariums and the like containing fish.

BACKGROUND AND OBJECTS

For many years, municipal water systems have used chlorine in the water to disinfect the water prior to its introduction to the distribution system for ultimate consumer use. The chlorine has been introduced in several different forms, depending upon the particular treatment system used in the municipality. One of the more common forms for chlorine introduction has been through the use of hypochlorites, such as sodium hypochlorite.

In recent years, various agencies have discovered that chlorine has not always been adequate for disinfecting water before its introduction into the water distribution systems. Most notably, older water systems which have been in use for many years have experienced a reduction in the germicidal action of chlorine. The chlorine is not effective in long line systems and those with extensive corrosion buildups, as the chlorine treatment tends to weaken under such conditions to levels which are ineffective for bacterial control.

Further, when chlorine alone is used, it may react under certain situations with tannins and lignins present in the water to form trihalomethanes which are suspected carcinogens.

For these reasons, some municipal water treatment systems have begun to add "chloramines" to the water as a germicide. Chloramine is a combination of ammonia and chlorine which is very stable, and has the chemical formula $NH_2Cl$. Indeed, some water treatment systems have been ordered by federal agencies to add chloramine to the water systems in order to provide safe levels of germicidal activity. However, there does not appear to be any standard concentration of added chloramine, and while some water systems add chloramine at a concentration of about 0.2-1.0 ppm, others use higher concentrations in the range of 3.0-10.0 ppm. Isolated cases have appeared where concentrations as high as 20 ppm have been found.

Chloramine does not dissipate as rapidly as chlorine over time, and does not break down as rapidly as chlorine when exposed to sunlight. When dissolved in water, chloramine is a potent germicide. Thus, the chloramine has a beneficial effect in the water supply system.

However, it also has an undesirable aspect associated with its use in water. In particular, chloramine is very toxic to fish. When chloramines are added to a tank of fish, the fish will almost certainly die. Death is caused by anemia created in the fish from exposure to chloramine, which results from the chloramine molecule passing the gill membrane and entering the circulatory system of the fish. Depending on the amount of chloramine in the water, death may be quick or belated.

Fish keepers such as importers, breeders, fish shop owners and hobbyists are finding that commercially available chlorine removers will not remove chloramine from the water, due to its strong chemical bonding and stability in the aqueous system. Of course this high stability is also one of the reasons that chloramine is used in the first place.

In many instances, such as in Fort Lauderdale, Fla. and elsewhere, serious financial loss has occurred, causing grievous damage to fish keepers due to the presence of chloramine in the municipal water supply.

Chloramine can also be produced when ammonia and chlorine are added jointly to the water, as for example water in which life forms are present, such as in aquariums and in swimming pools.

It is known that chloramine may be broken down by reacting with sodium thiosulfate generally according to the following reaction:

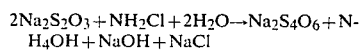

$$2Na_2S_2O_3 + NH_2Cl + 2H_2O \rightarrow Na_2S_4O_6 + NH_4OH + NaOH + NaCl$$

The foregoing reaction is highly pH dependent, and changes in the pH can alter the stoichiometry of the reactions. Essentially, however, the thiosulfate reacts with the chloramine to produce sodium chloride and ammonium hydroxide in aqueous solution.

The sodium chloride and sulfur hexaoxide produced are in such quantities as to be harmless to fish. However, the ammonia must also be removed in order to prevent its recombination with chlorine to regenerate the chloramine and stop any burning of the gills of fish. This ammonia removal requires another step with a suitable ammonia adsorber. However, such ammonia adsorption is usually quite slow, and thus not feasible for commercial or consumer use.

Thus the prior art process involves two steps coupled with careful control to ensure that all chloramine is reacted fully to form harmless chloride and then to ensure that all ammonia is removed. Such controls, however, are ordinarily beyond the capability of those having the need for the process.

Accordingly, a primary object of the present invention is to provide a novel product for the removal of chloramine from water.

Another object of the invention is to provide an easily usable product and method for removing chloramine from water.

A further object of the invention is to provide a product which can be used in but a single step for removing the chloramine from water and removing the undesirable products of reaction as well.

Still another object of the invention is to provide a novel product and method for removing chloramine from water which may be used quickly and easily by unskilled persons.

These and other objects of this invention will become apparent when considered in light of the following specification and claims.

DESCRIPTION OF THE INVENTION

The composition according to the present invention comprises a selective zeolite adsorber coated with sodium thiosulfate. Preferably, the product also contains a non-toxic indicator dye such as methylene blue, and also, optionally, the coating may contain ascorbic acid.

The combination of the zeolite with the sodium thiosulfate permits the reaction of the thiosulfate with the chloramine to break down the chloramine molecule to sodium chloride and ammonia according to the reactions above, and the zeolite very quickly adsorbs the liberated ammonia, thus preventing its recombination with available chlorine.

The sodium thiosulfate is preferably present in stoichiometric excess to ensure that all chloramine is removed, which is particularly important in view of the largely varying amounts of chloramine found in municipal water.

Various zeolites may be used, either naturally occurring or synthetic, however the preferred zeolite is naturally occurring clinoptilolite, a molecular adsorber which is found naturally in many areas of the world.

While the use of such molecular adsorbers is generally known, the use of such zeolites for ammonia adsorption, particularly at low ammonia concentration, is quite slow, being dependent upon a chance contact between the ammonia molecule and the adsorber. On the other hand, the speed of adsorption is considerably enhanced in a synergistic manner by the present composition. While not wishing to be bound by this theory, it appears that the greatly increased speed is a result of the proximity of the chemically active theaters to each other. The active sites are less than one micron apart on the surface of the finished compound, and thus the ammonia which is generated by the reaction with the sodium thiosulfate on the surface of the zeolite is very close spatially to the active sites of the zeolite, enabling rapid adsorption of the ammonia.

Thus, the breaking down of the chloramine molecule occurs very quickly, and the resulting ammonia is immediately adjacent the active sites on the zeolite, permitting a rapid adsorption of the ammonia, and thus a rapid action for the composition.

The dye (or dyes) when used, permits the manufacturer to determine when the sodium thiosulfate has fully coated the zeolite during manufacture, and also serves to assist in product identification for bulk users.

To use the product, one need simply contact the product with the water to be treated with some agitation. Conveniently, the product may be placed in a suitable water permeable container and moved through the tank. For bulk use, the water may be passed through a bed of the product. Also, the product may be simply added to a tank containing the water, and the water agitated or circulated for a few minutes to insure contact between the water and the resin product and complete reaction between the composition and the chloramine.

DESCRIPTION OF THE PREFERRED EMBODIMENTS

In order to prepare the product of the present invention, a solution of 1000 grams of sodium thiosulfate in 2600 milliliters of deionized and dechlorinated water is prepared with agitation until the solids are dissolved in the water and the solution is clear. Then, 5 grams of methylene blue is added to the solution.

To a suitable blender, 100 pounds of natural clinoptilolite is introduced. While the blender is running, the liquid solution is slowly poured into the blender, and the mixture is tumbled in the blender until the zeolite is evenly colored.

If desired, 145 grams of ascorbic acid may be added, and the agitation continued for approximately 5 minutes additional, again to evenly mix the product and disperse the ascorbic acid in the product.

The contents of the blender are then removed and dried in a dryer, or may be simply air dried by spreading into thin layers and allowing to stand in open air.

The product thus produced is then added to the water to be treated at a rate of about 4.6 grams per gallon of water, which is adequate for most municipal water containing chloramine.

Since the level of chloramine present in "tap water" is beyond the control of the user, the sodium thiosulfate should be present in the compound at an excess of that required stoichiometrically to treat normal chloramine content. The ratio given above thus provides a "safety factor" of about 50%. This means that the amount of thiosulfate is about 50% more than required to treat concentrations of chloramine normally found in municipal water.

To treat water according to the invention, one need simply add the product to the tank of water so as to contact the water with the product. Alternatively, a quantity sufficient to treat the water, i.e. about 4-5 grams per gallon of water may be introduced into a suitable water permeable container, for example a nylon stocking, and then immersed into the tank. Stirring the stocking containing the product through the tank will bring about the treatment adequately to quickly remove all chloramine present.

While this invention has been described as having certain preferred features, it will be understood that it is capable of still further modification, and this application is intended to cover all variations and adaptations thereof which fall within the spirit of the invention and the scope of the appended claims.

We claim:

1. A composition for the removal of chloramine from water comprising a zeolite having a coating of sodium thiosulfate thereon.

2. A composition as in claim 1 and wherein said sodium thiosulfate is present in stoichiometric excess for that required to fully react with chloramine to produce chloride ions.

3. A composition as in claim 1 and wherein said zeolite is a natural zeolite.

4. A composition as in claim 3 and wherein said zeolite is clinoptilolite.

5. A composition as in claim 1 and wherein said coating includes methylene blue.

6. A composition as in claim 4 and wherein said coating includes methylene blue.

7. A composition as in claim 1 and wherein said coating includes a non-toxic dye.

8. A composition for the removal of chloramine from water comprising clinoptilolite resin having a coating thereon of a mixture of sodium thiosulfate, ascorbic acid and methylene blue.

* * * * *